US009204353B2

United States Patent
Hsu et al.

(10) Patent No.: US 9,204,353 B2
(45) Date of Patent: Dec. 1, 2015

(54) RECEIVER-ONLY TUNE-AWAY

(71) Applicant: QUALCOMM Incorporated, San Diego, CA (US)

(72) Inventors: Chih-Ping Hsu, San Diego, CA (US); Farrukh Usmani, Carlsbad, CA (US); Ling Hang, San Diego, CA (US); Rajagopal Jeenagala, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 13/831,691

(22) Filed: Mar. 15, 2013

(65) Prior Publication Data

US 2014/0274051 A1    Sep. 18, 2014

(51) Int. Cl.
*H04W 36/20* (2009.01)
*H04W 88/06* (2009.01)

(52) U.S. Cl.
CPC .............. *H04W 36/20* (2013.01); *H04W 88/06* (2013.01)

(58) Field of Classification Search
CPC ..... H04W 48/16; H04W 48/18; H04W 16/28; H04W 36/30; H04B 1/3816
USPC .............. 455/436–439, 435.2, 434, 500, 558; 370/331, 332
See application file for complete search history.

(56) References Cited

U.S. PATENT DOCUMENTS

| 5,774,805 | A | 6/1998 | Zicker |
| 7,848,305 | B2 | 12/2010 | Joshi et al. |
| 2006/0209801 | A1 | 9/2006 | Joshi et al. |
| 2009/0213765 | A1 | 8/2009 | Rinne et al. |
| 2010/0137025 | A1* | 6/2010 | Tal et al. ..................... 455/553.1 |
| 2011/0043527 | A1* | 2/2011 | Ording et al. .................. 345/428 |
| 2011/0217969 | A1 | 9/2011 | Spartz et al. |
| 2012/0020310 | A1 | 1/2012 | Ji et al. |
| 2012/0178402 | A1* | 7/2012 | Krishnamoorthy et al. .......................... 455/404.1 |
| 2012/0258707 | A1 | 10/2012 | Mathias et al. |
| 2013/0023275 | A1* | 1/2013 | Mutya et al. ............... 455/452.1 |
| 2013/0150111 | A1 | 6/2013 | Su et al. |
| 2013/0172023 | A1* | 7/2013 | Chan et al. .................... 455/466 |
| 2013/0203438 | A1* | 8/2013 | Shin .......................... 455/456.1 |

(Continued)

FOREIGN PATENT DOCUMENTS

EP    2605554 A1    6/2013

OTHER PUBLICATIONS

International Search Report and Written Opinion—PCT/US2014/028492—ISA/EPO—Jul. 28, 2014.

*Primary Examiner* — Cong Tran
(74) *Attorney, Agent, or Firm* — The Marbury Law Gorup, PLLC

(57) ABSTRACT

Various embodiments include methods, systems, and devices for tuning away a mobile device's receiver without retuning the mobile device's transmitter, thereby allowing the mobile device to monitor multiple networks with a single radio frequency (RF) chain while avoiding the problems often associated with tune-away methods, such as loss of throughput, loss of tracking or synchronization, delays in acknowledgments, delays in rate control or channel quality control feedback, etc. The transmitter may remain tuned to a first network while the receiver may be separately tuned to one or more other networks. In various embodiments, the separately tuned receiver may monitor for paging signals on one or more networks while the transmitter remains tuned to the first network and transmits data or control signals.

39 Claims, 9 Drawing Sheets

(56) References Cited

U.S. PATENT DOCUMENTS

| | | | |
|---|---|---|---|
| 2013/0210484 A1* | 8/2013 | Jeenagala et al. | 455/552.1 |
| 2013/0260758 A1* | 10/2013 | Zhao et al. | 455/436 |
| 2013/0303181 A1* | 11/2013 | Rajurkar et al. | 455/452.1 |
| 2013/0310057 A1* | 11/2013 | Tabet et al. | 455/450 |
| 2013/0337850 A1* | 12/2013 | Ljung | 455/458 |
| 2014/0007019 A1* | 1/2014 | Saukko et al. | 715/863 |
| 2014/0119293 A1* | 5/2014 | Sikri et al. | 370/329 |
| 2014/0148178 A1* | 5/2014 | Wippich | 455/450 |

\* cited by examiner

RECEIVER-ONLY TUNE-AWAY

BACKGROUND

Cellular and wireless communication devices have seen explosive growth over the past several years. This growth has been fueled by better communications hardware, larger networks, and more reliable protocols. Today's smartphones include cameras, GPS receivers, Bluetooth® transceivers, and of course the cellular communication capabilities (e.g., LTE, 3G and/or 4G network access) to enable the mobile devices to establish data communication links with the Internet. Smartphones are now very widely deployed in society. Additionally, the components and capabilities in smartphones are now very affordable, enabling the capabilities to be deployed in other types of devices.

Many networks have been deployed to support these wireless devices, and wireless devices may now include more than one network interface to take advantage of multiple available networks. However, wireless devices often have a limited power supply (i.e., battery) and the multiple radio devices needed to simultaneously operate more than one network interface can be a heavy drain on power.

Some modern wireless devices allow two or more network interfaces to share a single receiver/transmitter chain (i.e., the circuitry associated with the radio between the antenna and the modem). For example, a mobile phone may be configured such that two or more SIM (subscriber identity module) cards may share a single transceiver (e.g., dual SIM dual standby "DSDS"). Such a phone allows users to send and receive data on multiple networks using only a single radio.

However, the receiver/transmitter chain in such devices only tunes to a single network at a time, and therefore the two or more network interfaces cannot operate simultaneously. Instead, the mobile device may monitor multiple interfaces in a standby mode by tuning to one network and then to the other network. For example, the radio may connect to a first network and periodically tune-away to other networks on standby to maintain service. In this tune-away procedure, the radio quickly tunes to the standby network for a relatively short time and then tunes back to the first network to continue a voice or data call. This "tune-away" procedure allows the mobile device to monitor for pages (e.g., pages associated with maintaining connections to a network and indicating incoming calls) received on the standby network(s). If a page is received, a user may switch networks if desired or the mobile device may automatically switch networks, such as to answer an incoming telephone call.

The tune-away procedure allows a mobile device to monitor multiple networks but there is a cost. Tuning away to another network typically interrupts transmissions to the first network, because in conventional mobile devices both the receiver and transmitter circuits are tuned to the new network. This can reduce throughput of data transmitted to and from the first network for the mobile device, since the transmitter of the mobile device must pause data transmissions for the duration it is tuned away to the standby network. This may interrupt tracking of the mobile device or synchronization between the first network and the mobile device. This interruption can also delay sending acknowledgements by the mobile device, which in some instanced may cause the network to time out, which wastes energy associated with resending data that was actually received successfully. Also, interruptions can delay sending rate control, flow control, or channel quality feedback. The cost of these issues can add up as a multi-technology mobile device may tune-away frequently.

SUMMARY

The various embodiments provide systems, devices, and methods for tuning away a mobile device's receiver without tuning the mobile device's transmitter, thereby allowing the mobile device to monitor multiple networks with a single radio chain while mitigating the problems often associated with tune-away methods such as loss of throughput, loss of tracking or synchronization, delays in acknowledgments, delays in rate control or channel quality control feedback, etc. The transmitter may remain tuned to a first network while the receiver may be separately tuned to a second network. In various embodiments, the separately tuned receiver may monitor for paging signals on the second network while the transmitter remains tuned to the first network and transmits data or control signals.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
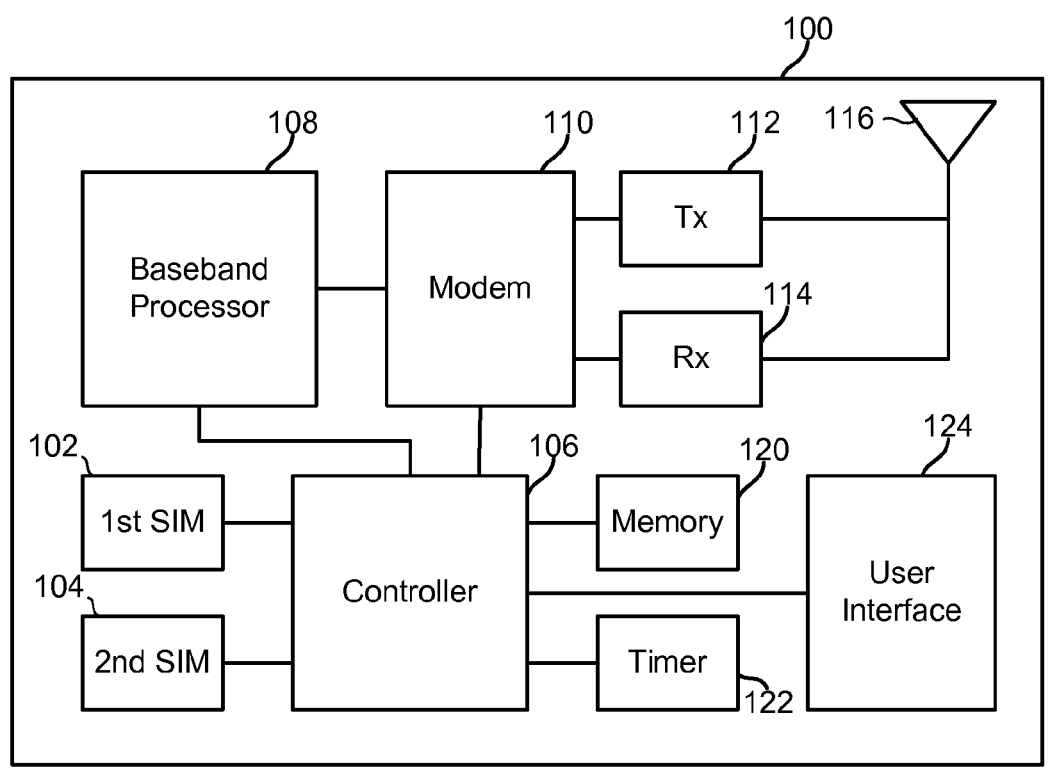
FIG. 1 is a component block diagram of a mobile device with multiple network interfaces which may be used in various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device," "wireless device," and "computing device" are used interchangeably herein to refer to any one or all of cellular telephones, smartphones, personal or mobile multi-media players, personal data assistants (PDA's), laptop computers, tablet computers, ultrabooks, palm-top computers, wireless electronic mail receivers, multimedia Internet enabled cellular telephones, wireless gaming controllers, and similar personal electronic devices which include a programmable processor, a memory and circuitry for sending and/or receiving wireless communication signals.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Mobile devices may include multiple radios and network interfaces to allow multiple simultaneous network connections, but this can be costly, both in terms of manufacturing expenses and in power consumption based on a mobile device's often limited power supply. Tune away is a method that allows mobile devices with a single radio frequency (RF) chain (i.e., combination of antenna, transmitter circuit, receiver circuit and related circuits) to connect with a first network and monitor another network or networks. If a signal is received on one of the monitored additional network(s), the mobile device or a user may determine whether to form a connection with the additional network, as well as whether to continue monitoring one or more other networks after making such a connection.

Tune away allows mobile devices with a single RF chain to use multiple radio technologies or networks. Advantages of operating on more than one radio technology or network include getting better service from the same service provider or operating as different devices (i.e., the same mobile device may include multiple identities, such as more than one SIM card) from two or more different service providers.

For example, some technologies may only offer data service but not voice such as CDMA 1x DO and LTE. A mobile device may use a single RF chain to operate on both LTE for high speed data service and CDMA 2000 for voice service, both from the same service provider.

Alternately, the mobile device may use a single RF chain to operate on two or more networks from two or more different service providers, either with the same technology or with different technologies. For example, a mobile device may use two SIM cards or any other subscription identifier on the same device to connect to different service providers.

Tuning away to a second network typically interrupts transmissions to the first network, because in conventional mobile devices both the receiver and transmitter circuits are tuned to the new network during the tune-away process. The transmitter and receiver are conventionally tuned in coordination to insure that the mobile device receives certain control signals, such as a pilot signal or power control signals that control how the transmitter should be operated to avoid interfering with other mobile devices and the network in general.

However, the interruption from retuning the transmitter during the tune-away process can reduce throughput of data transmitted to the first network from the mobile device, since the transmitter must pause data transmissions for the duration it is tuned away to the standby network (which also referred to herein as the "second network"). This may interrupt tracking of the mobile device or synchronization between the first network and the mobile device. This interruption can also delay sending acknowledgements from the mobile device to the first network that in some instanced may cause that network to time out and retransmit a message, which wastes energy associated with resending data that was actually received successfully. Also, interruptions can delay sending rate control, flow control, or channel quality feedback. The cost of these issues can add up as a multi-SIM single RF chain mobile device may tune-away frequently.

The various embodiments provide methods, devices, and systems for tuning away a mobile device's receiver without also tuning away the mobile device's transmitter, thereby allowing the mobile device to monitor multiple networks with a single radio chain while avoiding the problems often associated with tune-away methods, such as loss of throughput, loss of tracking or synchronization, delays in acknowledgments, delays in rate control or channel quality control feedback, etc. The mobile device's transmitter may remain tuned to a first network while the mobile device's receiver is separately tuned to a second network. In various embodiments, the separately tuned receiver circuit may monitor for paging signals on the second network while the transmitter remains tuned to the first network and transmits data or control signals. The various embodiments are particularly useful for multi-subscription mobile device that may operate on multiple radio technologies.

Tuning away only the receiver may prevent the mobile device from receiving signals from the first network for the duration of the tune-away, but the mobile device may keep transmitting, such as transmitting necessary acknowledgements of previously received data. However, when transmitting without monitoring with the receiver the mobile device may not realize when it is jamming the RF chain. In various embodiments, the mobile device may determine whether tune-away will create interference or jamming of the RF chain, and any tune-away of the receiver may be delayed or limited to short enough durations so that the mobile device does not inadvertently jam the RF chain.

FIG. 1 illustrates a component block diagram of a mobile device 100 that may be used in various embodiments. The mobile device 100 may include a single radio frequency (RF) chain with a baseband processor 108 connected to a modem 110. The modem 110 may be connected to a transmitter 112 and a receiver 114. The transmitter 112 and receiver 114 may each be connected to an antenna 116. Although the transmitter 112 and receiver 114 are shown as separate components in FIG. 1, alternate embodiments may include a transceiver capable of both transmitting and receiving signals.

The transmitter 112 and receiver 114 (or alternately, the transmitter and receiver portions of a transceiver) may be configured to be tuned separately. For example, the transmitter 112 may be tuned to transmit on a first frequency or frequency band while the receiver 114 is tuned to receive a second frequency or frequency band. In another example, the transmitter 112 and receiver 114 may be tuned to the same frequency or frequency band and then the receiver 114 may be tuned to a second frequency or frequency band while the transmitter 112 remains tuned to the first frequency or frequency band.

In further embodiments, the transmitter 112 and receiver 114 may be configured to operate with different network technologies, such as operating with different spectrum masks, modulated waveforms, frequency accuracy for the transmitter and sensitivity, adjacent channel selectivity, and/or spurious response for the receiver.

The modem 110 and baseband processor 108 may be connected to a controller 106, such as a processor or microcontroller. The controller 106 may also be connected to a first SIM 102 and a second SIM 104. Although only two network interfaces are shown in FIG. 1, further embodiments may include any number of network interfaces.

The controller 106 may also be connected to one or more memories, such as memory 120, and one or more timers, such as timer 122. The controller may also be connected to one or more input or output devices, such as a user interface 124 which may include devices such as one or more buttons, touchscreens, displays, speakers, and/or microphones.

The first and second network interfaces 102, 104 may include various types of interfaces configured to authorize or authenticate a connection with a network. Each interface may correspond to one or more separate networks or networking technologies or to different accounts on the same network. For example, in various embodiments the first network interface may connect to a data network while the second network interface may connect to a voice network.

In various embodiments, each network interface may be a subscriber identification module (SIM) hardware, memory, or card that stores one or more encoded values that uniquely identify the SIM, such as an International Mobile Subscriber Identity (IMSI), as well as one or more keys or codes used for authentication. The SIM may also store one or more encoded values that identify a home network, an account with a network, and/or the current network to which the mobile device is connected.

One of the network interfaces 102, 104 may be used to connect with a first network. As an example, when the mobile device 100 is powered on, the modem 110 may scan the available wireless networks to determine whether a connection through the first network is available. The mobile device 100 may compare encoded values stored on the first or second network interfaces 102, 104 to one or more values received from the first network and establish a connection if there is a match. Once a connection is established, the mobile device 100 may communicate with the first network, such as exchanging voice or data calls.

Figure 2A:
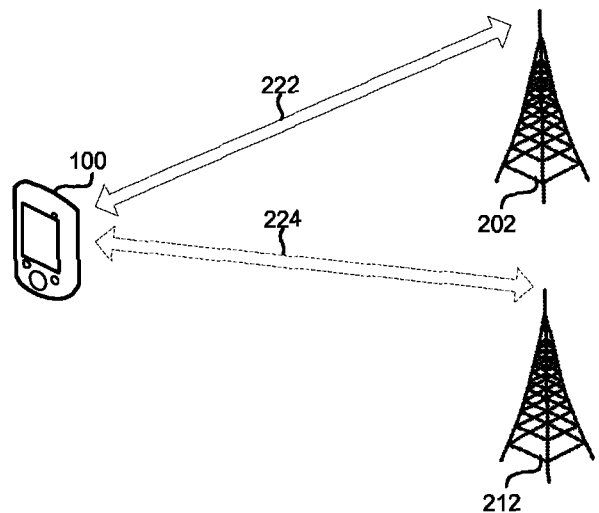
FIG. 2A illustrates a communication system with connections in a tune-away method.

The mobile device 100 may monitor one or more additional networks, such as a second network corresponding to the second network interface 104, in a process called tune-away. If the mobile device 100 has a single RF chain, the mobile device may send and receive data with one network at a time. The mobile device may be communicating with the first network, tune-away or retune the transmitter 112 and receiver 114 to the second network, and then tune back to the first network. FIG. 2A illustrates such a process. The mobile device 100 may establish a first connection 222 with a first network, represented in FIG. 2A by the first base station 202. Connection 222 may operate in both directions (i.e., full duplex) allowing the mobile device 100 to send and receive signals when both the transmitter 112 and receiver 114 are tuned to the first network. Then, the mobile device may tune away to a second network represented by the second base station 212 to form connection 224. Because of the short duration of a typical tune-away, the second connection 224 may not be a formal connection (e.g., it may not involve a setup period such as exchanging synchronization messages with the network). Instead, the mobile device 100 may simply retune the transmitter 112 and receiver 114 from the first network to the second network in order to receive or transmit. The second connection 224 with the second base station 212 is illustrated as a dotted line because the connection does not exist simultaneously with the first connection 222.

Figure 2B:
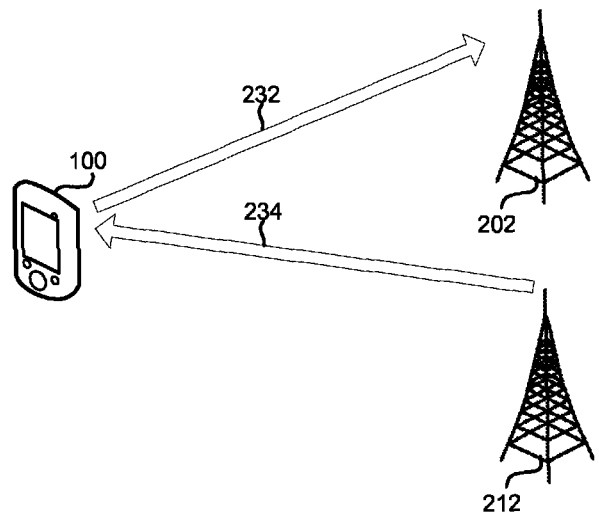
FIGS. 2B and 2C illustrate communication systems with connections in a receiver-only tune-away operation according to various embodiment methods.

Various embodiments include a receiver-only tune-away method in which the receiver 114 is tuned away while the transmitter remains tuned to the original network. For example, a mobile device 100 may be connected to a first network via a first connection 222 in a first state. The mobile device 100 may enter a second state, such as illustrated in FIG. 2B, in which the transmitter 112 remains tuned to the first network (as indicated by the communication link 232 in a single direction going to the base station 202 from the mobile device 100) while the receiver 114 is tuned to a second network (as indicated by the communication link 234 in a single direction going to the mobile device 100 from the base station 212). In this second state, the mobile device 100 may receive signals, such as paging signals, from the second network while still transmitting to the first network. The mobile device 100 may return to the first state (i.e., tune the receiver 114 back the first network) after a tune-away period ends, such as in response to no paging signal or other signal being received from the second network.

Figure 2C:
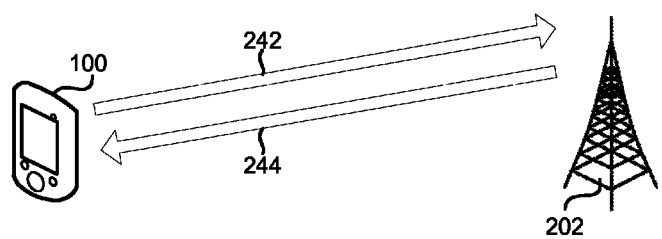

In general, when two (or more) communication links are being maintained by a mobile device with a single base station, the embodiments enable maintaining the two communication links, regardless of whether the two links involve different technologies, different user accounts, different user settings, or combinations of these differences. The mobile device processor may start in a first state with a two-way connection 222 to a first wireless network. This connection 222 may correspond to the first account. The mobile device 100 may enter a second state as illustrated in FIG. 2C in which the mobile device 100 is connected with the base station 202 of the network by a first communication link 242 and a second communication link 244. The first communication link 242 may be in a single direction going to the base station 202 from the mobile device 100 and represent the transmitter 112 remaining tuned to a frequency or range of frequencies of a first communication link. The second communication link 244 may be transmissions from the base station 202 that the mobile device 100 may receive. The mobile device 100 may return to the first state by tuning the receiver 114 back to the first account after the tune-away period ends.

Figure 3:
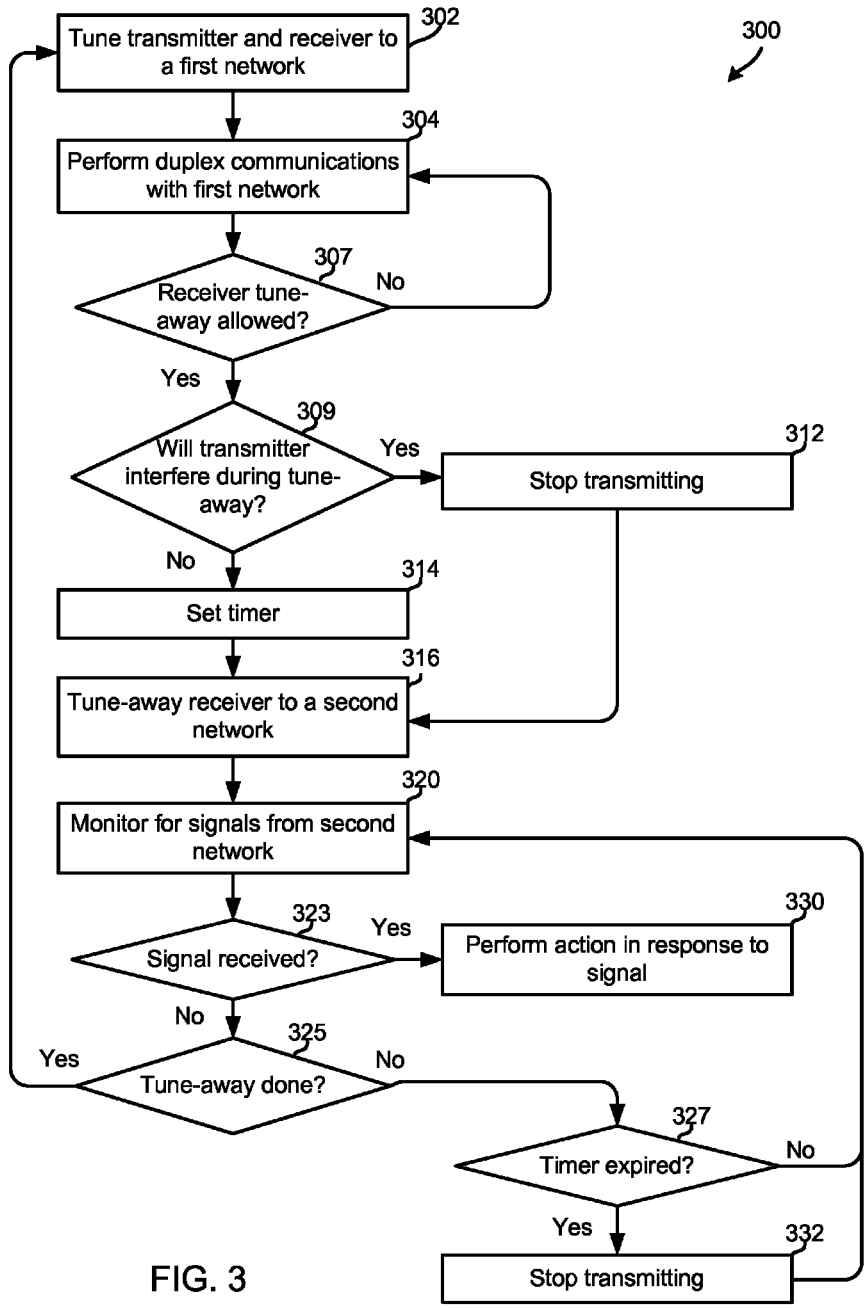
FIG. 3 is a process flow diagram of an embodiment method for a receiver-only tune-away operation.

FIG. 3 illustrates an embodiment receiver-only tune-away method 300. In block 302, a processor of the mobile device 100 may tune the transmitter 112 and receiver 114 to a first network. In block 304, the mobile device 100 may perform full-duplex communications with the first network, such as establishing a connection and transferring voice or data signals between the mobile device and the first network.

In determination block 307, the a processor of the mobile device 100 (e.g., a modem processor, a CPU or another processor) may determine whether receiver tune-away is allowed. This determination may be based on various factors, such as whether a second network is within range, whether tune-away is disabled or enabled by a user, whether higher priority communications with the first network cannot spare the receiver, etc. If the processor determines that tune-away is not allowed (i.e., determination block 307=No), the mobile device 100 may continue communicating with the first network in block 304 without performing tune-away.

If the processor determines that tune-away is allowed (i.e., determination block 307=Yes), the mobile device 100 may determine whether the transmitter and receiver will interfere with each other during the receiver tune-away in block 309. This determination may involve comparing future planned transmission frequencies with the tune-away frequencies. For example, if the mobile device communicates with the first network with a frequency hopping method, the mobile device could perform a first table lookup for the future frequency hops for transmission and compare the results to a second table lookup for the times and frequencies that would be used by the receiver in a tune-away. Overlap between the table lookup results may indicate potential interference. If the mobile device determines there will be interference (i.e., determination block 309=Yes), the mobile device may stop transmitting in block 312 and then begin the receiver-only tune away in block 316.

If the mobile device processor determines that the transmitter and receiver will not interfere with each other during the receiver tune-away (i.e., determination block 309=No), the mobile device may set a timer in block 314, such as one of the one or more timers 122. The timer may be set to various times, such as how long the transmitter can continue to transmit without interfering with the receiver during tune away. In other embodiments, the timer may be set for a duration that the receiver may be tuned away without the mobile device falling out of sync with the first network because the mobile device is no longer receiving a pilot signal from the first network.

The mobile device may tune the receiver away to a frequency or range of frequencies corresponding to a second network in block 316. The mobile device may time the tune-away to match anticipated signals from the second network. For example, the mobile device may tune-away the receiver to the second network when a paging signal period is scheduled. During the receiver-only tune-away, the transmitter may remain tuned to the first network to continue transmitting or may stop transmitting.

In block 320, the mobile device may monitor for signals from the second network. For example, the mobile device may listen for paging signals indicating an incoming call or a request to connect to transfer data. The mobile device processor may determine whether a relevant signal (i.e., a signal intended for the mobile device and not noise or a signal for another device) is received in determination block 323. In various embodiments, this determination may be based on checking each page signal that is received. In further embodiments, this determination may be skipped or only performed periodically to insure that the mobile device continues to check whether the tune-away period has ended or whether the timer has expired as explained below.

If the mobile device processor determines that a relevant signal is received (i.e., determination block 323=Yes), the mobile device may perform one or more actions in response to the signal in block 330. These actions may depend on the signal received. For example, in response to receiving a paging signal the mobile device processor may tune the transmitter to the second network and proceed to respond to the paging signal to take a call. Alternately, the mobile device processor may prompt a user for a decision regarding whether to respond to the paging signal or request to connect.

If the mobile device processor determines that the mobile device does not receive a relevant signal from the second network (i.e., determination block 323=No), the mobile device processor may determine whether the tune-away period is complete in determination block 325. This determination may be based on various factors, such as the expiration of a second timer or a determination that a paging signal period scheduled on the second network is over. If the mobile device processor determines that the tune-away is complete (i.e., determination block 325=Yes), the mobile device may return to block 302 and tune the transmitter and receiver to the first network. In some cases, the transmitter may already be tuned to the first network, such as in response to no signal being received during the tune-away, so it may just be the receiver that is retuned.

If the mobile device processor determines that the tune-away is not complete (i.e., determination block 325=No), the mobile device processor may determine whether the timer set in block 314 has expired in determination block 327. If the mobile device processor determines that the timer has not expired (i.e., determination block 327=No), the mobile device processor may return to block 320 to continue monitoring for signals from the second network. In response to the timer expiring (i.e., determination block 327=Yes), the mobile device processor may stop transmitting (if the transmitter is still transmitting) in block 332, and return to block 320 to continue monitoring for signals from the second network.

Figure 4A:
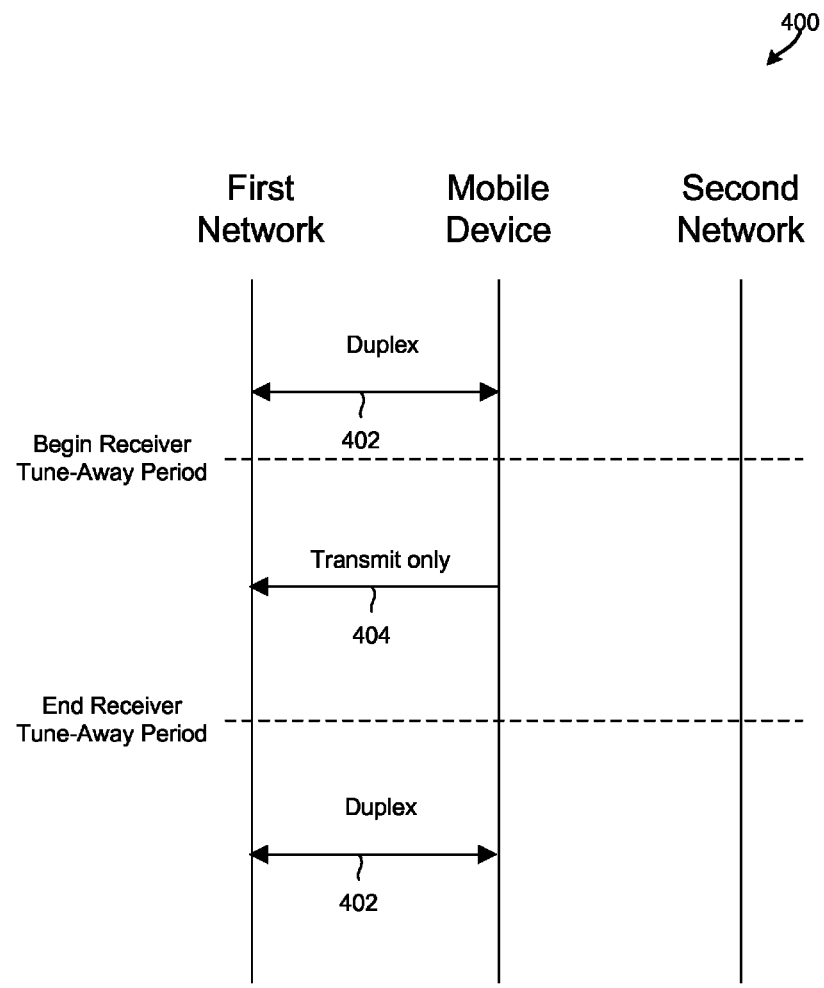
FIGS. 4A-4C are call flow diagrams illustrating mobile device transmissions during various circumstances according to an embodiment.

FIG. 4A illustrates call flows 400 during a tune-away in which no signal is received from the second network. The mobile device 100 may have an established a full duplex connection 402 with a first network (e.g., through a first base station). After the receiver tune-away period begins, the mobile device's connection 404 with the first network may be one way (i.e., transmit to the first network only) while it listens to the second network. If no relevant signal (e.g., no matching page signal) is received from the second network, the mobile device may return to the full duplex connection 402 after the end of the receiver tune-away period.

Figure 4B:
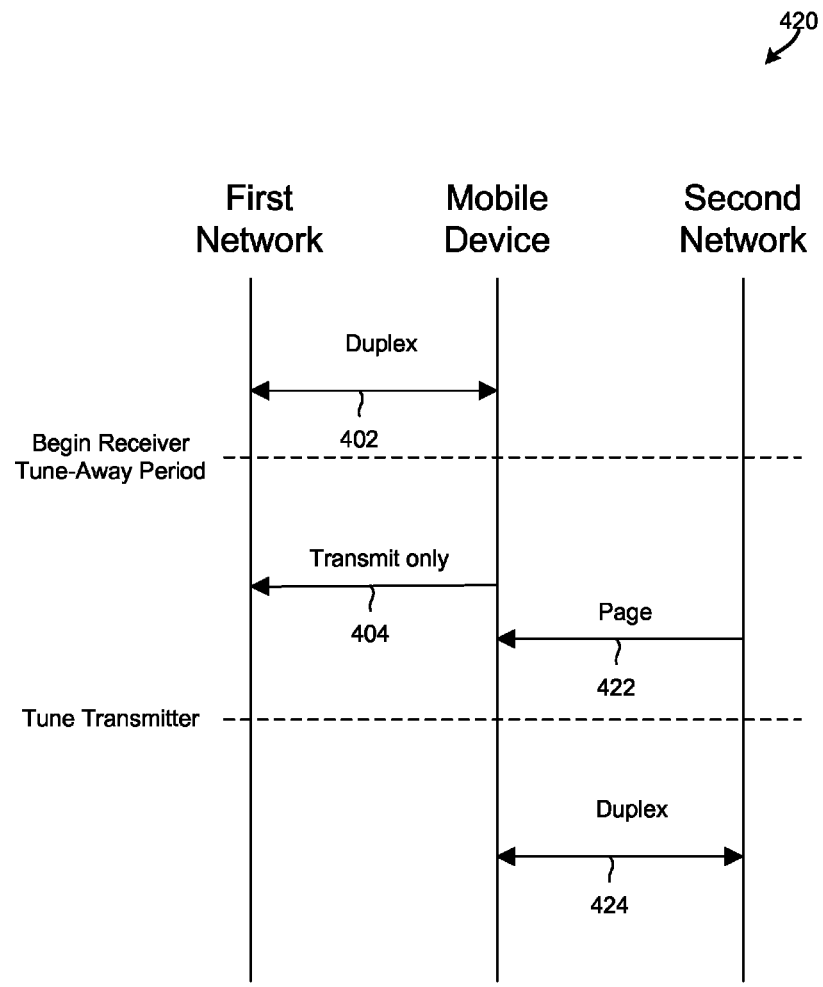

FIG. 4B illustrates call flows 420 during a tune-away in which a paging signal is received from the second network. The mobile device 100 may have an established a full duplex connection 402 with a first network (e.g., through a first base station) as in FIG. 4A. After the receiver tune-away period begins, the mobile device's connection 404 with the first network may be one way (i.e., transmit to the first network only) while it listens to the second network. A page 422 may be received by the mobile device from the second network. The mobile device may drop any connection with the first network and retune the transmitter to set up a full duplex connection 424 with the second network.

In various receiver-only tune-away embodiments, the transmitter may continue to transmit to the first network. However, transmitting without being able to receive may create problems. The mobile device may be unable to receive the first network's pilot signal and may fall out sync or miss power control signals. Further, the mobile device may miss any acknowledgements for any data transmitted. Therefore, in various embodiments, the transmitter may be limited in what it is transmitted. For example, rather than transmitting data the whole time, the mobile device may transmit data near the end of the tune away period such that any acknowledgements will be received after tune-away is complete. The mobile device may also send any acknowledgements still pending when the tune-away period begins. Further, the transmitter may still transmit a pilot signal to inform the first network it is still present and connected to avoid having to reconnect.

Figure 4C:
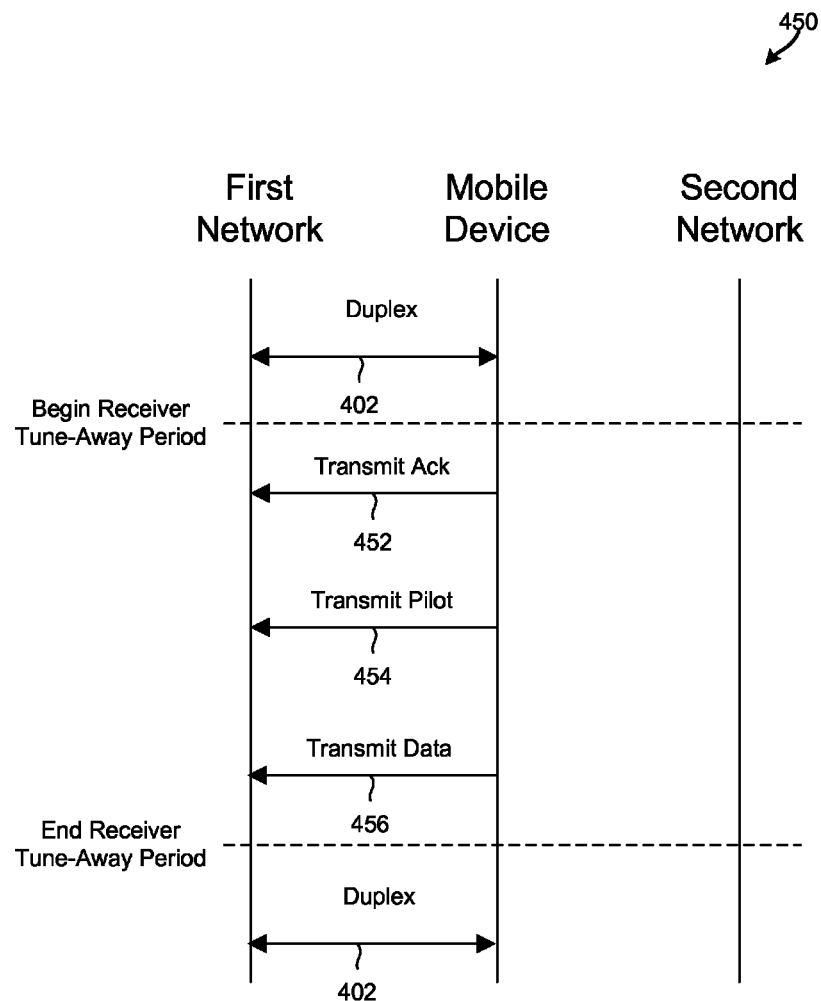

FIG. 4C illustrates call flows 450 with a transmitter sending various types of signals. The mobile device 100 may have an established a full duplex connection 402 with a first network (e.g., through a first base station) as in FIG. 4A. After the receiver tune-away period begins, the mobile device may transmit any pending acknowledgements 452. The mobile device may also transmit a pilot signal 454 to the first network. The mobile device may begin transmitting data again 456 prior to the end of the receiver tune-away period. If no signal is received from the second network, the mobile device may return to the full duplex connection 402 after the end of the receiver tune-away period.

In various embodiments, the mobile device's connection 404 with the first network may be used for any combination of pending acknowledgements 452, pilot signal 454, and data 456. Alternately, the mobile device's connection 404 with the first network may be the full transmission portion of the full duplex connection 402 (i.e., simplex from mobile device to the network).

Figure 5:
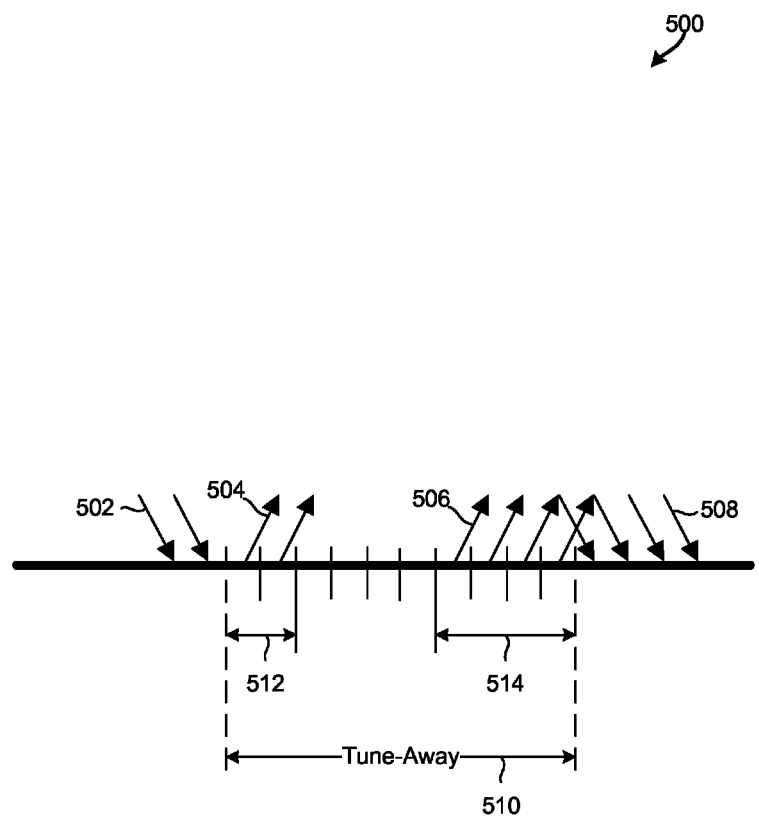
FIG. 5 is a time plot of packets transmitted between a mobile device and first network in an embodiment.

FIG. 5 illustrates the timing of signals between a mobile device and a first network in an embodiment. The mobile device will be unable to receive signals from the first network during a receiver-only tune-away period 510 because the receiver will be tuned to a second network. Various communication protocols involve some kind of delay between receipt of a data packet and transmission of an acknowledgement. If data packets 502 are received prior to the tune-away period 210, the mobile device may send acknowledgements 504 for these packets during the tune-away period 510, such as in an acknowledgement period 512.

In various embodiments, the mobile device may not transmit data during the tune-away period 510 to avoid the issues discussed above. Alternately, the mobile device may transmit data 506 near the end of the tune-away period 510, such as during a data period 514. Transmitting data near the end of the tune-away period 510 enables acknowledgement messages to be received by the receiver when it tunes back to the first network at the conclusion of the tune-away period. The mobile device may determine when to begin transmitting data based on how based on the delay between transmitting data 506 and receiving acknowledgements 508 from the first network. This delay may be known or estimated based on the communication protocol in use and the propagation time between the mobile device and the first network.

Various networks may require a mobile device to check in periodically or maintain a pilot signal to keep a connection active. Loss of a connection may lead to a decrease in data rate or reduce overall throughput if a mobile device must reestablish a connection. Although not shown in FIG. 5, the mobile device may send a pilot signal at any time or at all times during the tune-away period 510 to prevent these problems since pilot signals do not require reception of an acknowledgement signal from the network by the receiver circuit.

Figure 6:
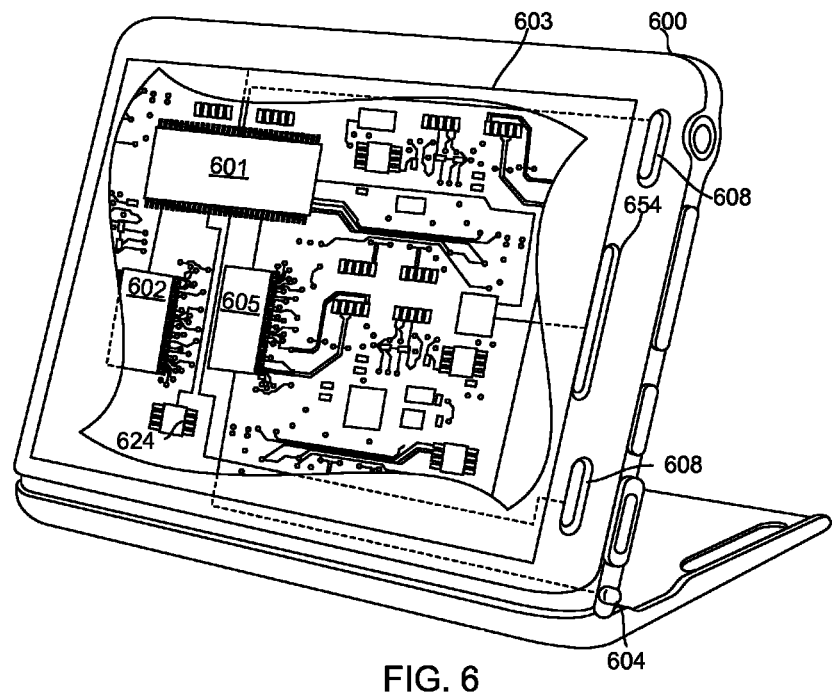
FIG. 6 is a component block diagram of a mobile device suitable for use in an embodiment.

FIG. 6 is a system block diagram of a smartphone type mobile device suitable for use with various embodiments. A smartphone 600 may include a processor 601 coupled to internal memory 602, a display 603, and to a speaker 654. Additionally, the smartphone 600 may include an antenna 604 for sending and receiving electromagnetic radiation that may be connected to a wireless data link and/or cell telephone transceiver 605 coupled to the processor 601 and capable of communicating over a wide area wireless communication network. Smartphones may include a separate short range radio transceiver 624 capable of communicating or pairing with wireless transmitter devices. Smartphones 600 typically may also include menu selection buttons or rocker switches 608 for receiving user inputs.

Figure 7:
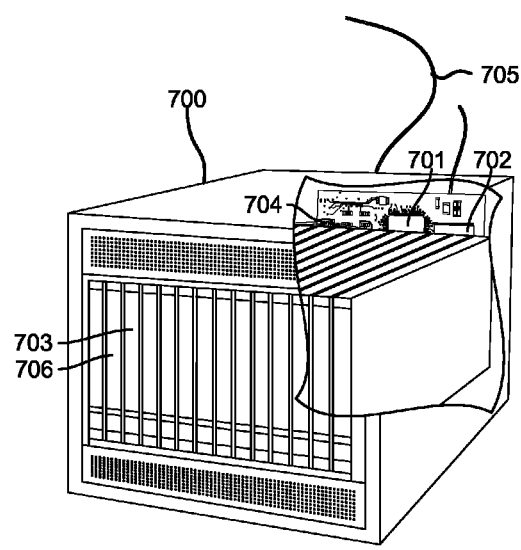
FIG. 7 is a component block diagram of a server device suitable for use in an embodiment.

The various embodiments may be implemented on any of a variety of commercially available server devices, such as the server 700 illustrated in FIG. 7. Such a server 700 typically includes a processor 701 coupled to volatile memory 702 and a large capacity nonvolatile memory, such as a disk drive 703.

The server 700 may also include a floppy disc drive, compact disc (CD) or DVD disc drive 706 coupled to the processor 701. The server 700 may also include network access ports 704 coupled to the processor 701 for establishing data connections with a network 705, such as a local area network coupled to other broadcast system computers and servers.

The processors 601, 701 may be any programmable microprocessor, microcomputer or multiple processor chip or chips that can be configured by software instructions (applications) to perform a variety of functions, including the functions of the various embodiments described below. In some mobile receiver devices, multiple processors 601 may be provided, such as one processor dedicated to wireless communication functions and one processor dedicated to running other applications. Typically, software applications may be stored in the internal memory 602, 702, 703 before they are accessed and loaded into the processor 601, 701. The processor 601, 701 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable instructions such as a software module, which may reside on a non-transitory computer-readable storage medium. Non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of communicating with a first network and a second network using a mobile device having a single radio comprising a transmitter and a receiver, the method comprising:
   tuning the transmitter and the receiver to the first network;
   transmitting to the first network with the transmitter;
   tuning away the receiver to a second network for a tune-away period;
   transmitting to the first network with the transmitter during the tune-away period;
   determining whether the transmitter and the receiver will cause interference during the tune-away period; and
   delaying the tuning away or shortening the tune-away period, in response to determining that the transmitter and the receiver will cause interference during the tune-away period.

2. The method of claim 1, further comprising:
   pausing transmissions from the transmitter in response to determining that the transmitter and the receiver will cause interference during the tune-away period, wherein determining whether the transmitter and the receiver will cause interference during the tune-away period comprises determining whether the transmitter will cause interference with the receiver.

3. The method of claim 1, further comprising:
   setting a timer for a duration that the transmitter can continue to transmit; and
   pausing transmissions from the transmitter in response to the timer expiring during the tune-away period.

4. The method of claim 1, further comprising:
   tuning the transmitter to the second network in response to receiving a page during the tune-away period.

5. The method of claim 1, further comprising:
   tuning the receiver to the first network in response to no signal being received during the tune-away period.

6. The method of claim 1, wherein transmitting to the first network with the transmitter during the tune-away period includes transmitting acknowledgements during the tune-away period.

7. The method of claim 1, wherein transmitting to the first network with the transmitter during the tune-away period includes transmitting a pilot signal during the tune-away period.

8. The method of claim 1, wherein transmitting to the first network with the transmitter during the tune-away period includes transmitting data packets during the tune-away period.

9. The method of claim 1, wherein the first network and the second network are the same network,
   wherein tuning the transmitter and the receiver to the first network comprises tuning the transmitter and the receiver to a first technology, and
   wherein tuning away the receiver to the second network comprises tuning the receiver to a second technology.

10. The method of claim 1, wherein determining whether the transmitter and the receiver will cause interference during the tune-away period comprises determining whether one of the receiver and the transmitter will cause interference with the other of the receiver and the transmitter.

11. A mobile device, comprising:
    a radio comprising a transmitter and a receiver configured to be tuned separately from the transmitter;
    a first network interface;
    a second network interface; and
    a processor coupled with the first network interface, the second network interface, and the radio,
    wherein the processor is configured with processor-executable instructions to:
    tune the transmitter and the receiver to a first network;
    transmit to the first network with the transmitter;
    tune away the receiver to a second network for a tune-away period;
    transmit to the first network with the transmitter during the tune-away period;
    determine whether the transmitter and the receiver will cause interference during the tune-away period; and
    delay the tune away or shorten the tune-away period, in response to determining that the transmitter and the receiver will cause interference during the tune-away period.

12. The mobile device of claim 11, wherein the first network interface is coupled to a first subscriber identification module (SIM) card and the second network interface is coupled to a second SIM card.

13. The mobile device of claim 11, wherein the processor is further configured with processor-executable instructions to:
    pause transmissions from the transmitter in response to determining that the transmitter and the receiver will cause interference during the tune-away period,
    wherein the processor is configured with processor-executable instructions such that determining whether the transmitter and the receiver will cause interference during the tune-away period comprises determining whether the transmitter will cause interference with the receiver.

14. The mobile device of claim 11, wherein the processor is further configured with processor-executable instructions to:
set a timer for a duration that the transmitter can continue to transmit;
pause transmissions from the transmitter in response to the timer expiring during the tune-away period.

15. The mobile device of claim 11, wherein the processor is further configured with processor-executable instructions to:
tune the transmitter to the second network in response to receiving a page during the tune-away period.

16. The mobile device of claim 11, wherein the processor is further configured with processor-executable instructions to:
tune the receiver to the first network in response to no signal being received during the tune-away period.

17. The mobile device of claim 11, wherein the processor is configured with processor-executable instructions such that transmitting to the first network with the transmitter during the tune-away period includes transmitting acknowledgements during the tune-away period.

18. The mobile device of claim 11, wherein the processor is further configured with processor-executable instructions such that transmitting to the first network with the transmitter during the tune-away period includes transmitting a pilot signal during the tune-away period.

19. The mobile device of claim 11, wherein the processor is configured with processor-executable instructions such that transmitting to the first network with the transmitter during the tune-away period includes transmitting data packets during the tune-away period.

20. The mobile device of claim 11, wherein the processor is configured with processor-executable instructions such that the first network and the second network are the same network, tuning the transmitter and the receiver to the first network comprises tuning the transmitter and the receiver to a first account, and tuning away the receiver to the second network comprises tuning the receiver to a second account.

21. A mobile device comprising:
a radio comprising a transmitter and a receiver configured to be tuned separately from the transmitter;
a first network interface;
a second network interface;
means for tuning the transmitter and the receiver to a first network;
means for transmitting to the first network with the transmitter;
means for tuning away the receiver to a second network for a tune-away period;
means for transmitting to the first network with the transmitter during the tune-away period;
means for determining whether the transmitter and the receiver will cause interference during the tune-away period; and
means for delaying the tuning away or shortening the tune-away period, in response to determining that the transmitter and the receiver will cause interference during the tune-away period.

22. The mobile device of claim 21, wherein the first network interface is coupled to a first subscriber identification module (SIM) card and the second network interface is coupled to a second SIM card.

23. The mobile device of claim 21, further comprising:
means for pausing transmissions from the transmitter in response to determining that the transmitter and the receiver will cause interference during the tune-away period, wherein means for determining whether the transmitter and the receiver will cause interference during the tune-away period includes means for determining whether the transmitter will cause interference with the receiver.

24. The mobile device of claim 21, further comprising:
means for setting a timer for a duration that the transmitter can continue to transmit;
means for pausing transmissions from the transmitter expiring the timer expiring during the tune-away period.

25. The mobile device of claim 21, further comprising:
means for tuning the transmitter to the second network in response to receiving a page during the tune-away period.

26. The mobile device of claim 21, further comprising:
means for tuning the receiver to the first network in response to no signal being received during the tune-away period.

27. The mobile device of claim 21, wherein means for transmitting to the first network with the transmitter during the tune-away period includes means for transmitting acknowledgements during the tune-away period.

28. The mobile device of claim 21, wherein means for transmitting to the first network with the transmitter during the tune-away period includes means for transmitting a pilot signal during the tune-away period.

29. The mobile device of claim 21, wherein means for transmitting to the first network with the transmitter during the tune-away period includes means for transmitting data packets during the tune-away period.

30. The mobile device of claim 21, wherein:
the first network and the second network are the same network; and
means for tuning the transmitter and the receiver to the first network comprises means for tuning the transmitter and the receiver to a first account, and tuning away the receiver to the second network comprises tuning the receiver to a second account.

31. A non-transitory computer-readable storage medium having stored thereon processor-executable software instructions configured to cause a mobile device to perform operations comprising:
tuning a transmitter and a receiver to a first network;
transmitting to the first network with the transmitter;
tuning away the receiver to a second network for a tune-away period;
transmitting to the first network with the transmitter during the tune-away period;
determining whether the transmitter and the receiver will cause interference during the tune-away period; and
delaying the tuning away or shortening the tune-away period, in response to determining that the transmitter and the receiver will cause interference during the tune-away period.

32. The non-transitory computer-readable storage medium of claim 31, wherein the stored processor-executable instructions are configured to cause the mobile device to perform operations further comprising:
pausing transmissions from the transmitter in response to determining that the transmitter and the receiver will cause interference during the tune-away period, wherein determining whether the transmitter and the receiver will cause interference during the tune-away period includes determining whether the transmitter will cause interference with the receiver.

33. The non-transitory computer-readable storage medium of claim 31, wherein the stored processor-executable instructions are configured to cause the mobile device to perform operations further comprising:

setting a timer for a duration that the transmitter can continue to transmit;
pausing transmissions from the transmitter in response to the timer expiring during the tune-away period.

34. The non-transitory computer-readable storage medium of claim 31, wherein the stored processor-executable instructions are configured to cause the mobile device to perform operations further comprising:
tuning the transmitter to the second network in response to a page being received during the tune-away period.

35. The non-transitory computer-readable storage medium of claim 31, wherein the stored processor-executable instructions are configured to cause the mobile device to perform operations further comprising:
tuning the receiver to the first network in response to no signal being received during the tune-away period.

36. The non-transitory computer-readable storage medium of claim 31, wherein the stored processor-executable instructions are configured to cause the mobile device to perform operations such that transmitting to the first network with the transmitter during the tune-away period includes transmitting acknowledgements during the tune-away period.

37. The non-transitory computer-readable storage medium of claim 31, wherein the stored processor-executable instructions are configured to cause the mobile device to perform operations such that transmitting to the first network with the transmitter during the tune-away period includes transmitting a pilot signal during the tune-away period.

38. The non-transitory computer-readable storage medium of claim 31, wherein the stored processor-executable instructions are configured to cause the mobile device to perform operations such that transmitting to the first network with the transmitter during the tune-away period includes transmitting data packets during the tune-away period.

39. The non-transitory computer-readable storage medium of claim 31, wherein the stored processor-executable instructions are configured to cause the mobile device to perform operations such that the first network and the second network are the same network, tuning the transmitter and the receiver to the first network comprises tuning the transmitter and the receiver to a first account, and tuning away the receiver to the second network comprises tuning the receiver to a second account.

* * * * *